Sept. 30, 1941.  S. E. BOUCHARD  2,257,224
OPHTHALMIC MOUNTING
Filed Oct. 19, 1940
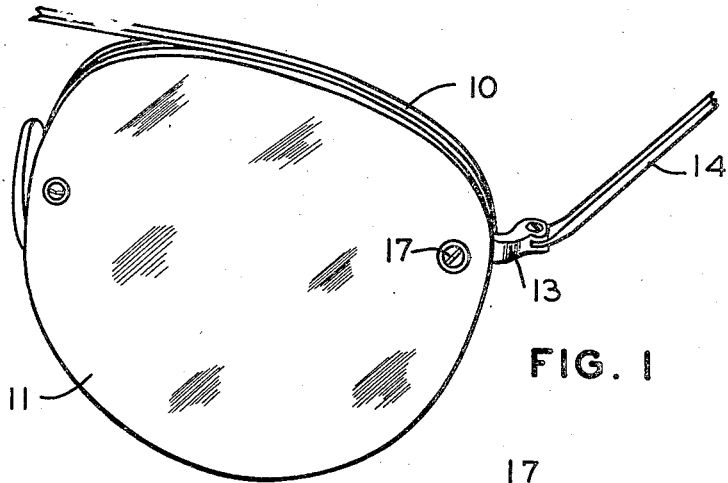
FIG. 1
FIG. 4
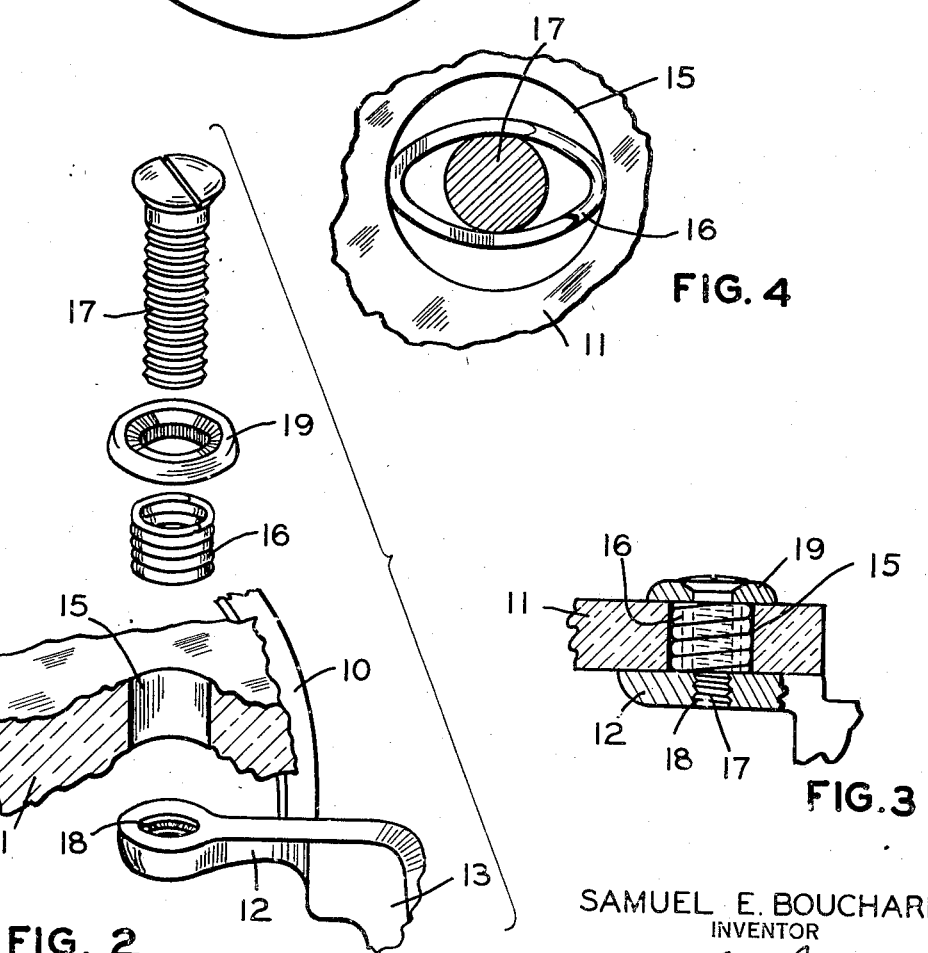
FIG. 2
FIG. 3
SAMUEL E. BOUCHARD
INVENTOR
BY *[signature]*
ATTORNEY Patented Sept. 30, 1941

2,257,224

UNITED STATES PATENT OFFICE 2,257,224

OPHTHALMIC MOUNTING

Samuel E. Bouchard, Rochester, N. Y., assignor to Bausch & Lomb Optical Company, Rochester, N. Y., a corporation of New York Application October 19, 1940, Serial No. 361,940

4 Claims. (Cl. 88—47)

This invention relates to ophthalmic mountings and more particularly it has reference to means for securing lenses to mountings of the rimless or semi-rimless type.

One of the objects of my invention is to provide an improved type of ophthalmic mounting which will be simple in structure, efficient in operation and capable of being readily fitted and manipulated by the optician. A further object is to provide an ophthalmic mounting of the rimless or semi-rimless type which will embody a resilient connection between the lens and mounting. These and other objects and advantages reside in certain novel features of construction, arrangement and combination of parts as will hereinafter be more fully described and pointed out in the appended claims.

Referring to the drawing:

Fig. 1 is a fragmentary view of an ophthalmic mounting embodying my invention.

Fig. 2 is a view, with parts in separated relation, showing the construction of the connection between the lens and mounting.

Fig. 3 is a sectional view through an assembled mounting taken along the major axis of the elliptical spring.

Fig. 4 is a view showing the relation of the lens aperture, screw and elliptical spring.

A preferred embodiment of my invention is shown in the drawing wherein 10 indicates a rim member which is located rearwardly of the lens 11 and constructed to follow the contour thereof. The rim member 10 carries a strap member 12 which engages the rear face of the lens 11 adjacent its temporal edge. A strap of similar construction, not shown, is provided for attaching the rim member 10 to the nasal edge of the lens 11, as will be readily understood by those skilled in the art. The strap member 12 carries the endpiece 13 for pivotally receiving the temple 14 in the usual manner.

The lens 11 is provided with the substantially circular aperture 15 adjacent its temporal edge. Positioned within the aperture 15 is the spirally coiled spring 16 whose height is substantially coextensive with the thickness of the lens 11. The spring 16 has, in the horizontal plane, a substantially elliptical shape with the major axis slightly greater in length than the diameter of aperture 15 and with the minor axis slightly less than the diameter of aperture 15. Hence, the spring 16 may be forced into aperture 15 and resiliently held therein while still providing a clearance between the spring and the wall of the aperture along the minor axis of the ellipse.

The lens 11 is secured to the strap member 12 by means of the screw 17 which passes through the spring 16 and is threaded into the opening 18 in strap member 12. A washer 19, formed of metal, zylonite or other suitable material, is positioned between the head of the screw 17 and the front face of the lens 11. The diameter of the screw 17 is slightly greater than the smallest internal dimension of the spring 16 and hence the screw is yieldably engaged by the spring 16.

As will be evident from Fig. 4, the spring 16 is resiliently held in the lens aperture 15 along the major axis of the elliptically shaped spring while a clearance is provided between the sides of the spring and the wall of the aperture. This provides a resilient or cushioning effect between the rigid screw 17 and the lens 11 and tends to reduce breakage of the latter. The mounting may be readily assembled by the optician and affords a convenient method for providing a resilient connection between the screw and the lens. It will be understood, of course, that the strap member on the nasal edge of the lens may be attached to the lens by a similar construction. My invention can, obviously, be adapted to various types of rimless or semi-rimless spectacles. Various modifications can be made without departing from the spirit of my invention.

I claim:

1. An ophthalmic mounting comprising a lens having an aperture adjacent one edge, a strap member engaging one face of the lens, a spirally coiled spring within said aperture and in frictional engagement with the wall of the aperture, said spring having a greater dimension in one direction than in another in transverse section, and a rigid retaining member positioned within said coiled spring and secured to said strap member, said retaining member being in frictional engagement with said spring.

2. In an ophthalmic mounting, the combination of a lens having a substantially circular aperture, a strap member engaging one face of the lens, a spring positioned within said aperture, said spring being substantially elliptical in shape and with its major axis slightly greater than and its minor axis slightly less than the diameter of said aperture whereby the spring is snugly fitted into the aperture, and a screw for holding the lens to the strap member, said screw passing through the opening of the spring and being in frictional engagement therewith.

3. In an ophthalmic mounting, the combination of a lens having a substantially circular aperture adjacent one edge, a strap member engaging one face of the lens, said member having a threaded opening, a spirally coiled spring positioned within the aperture in the lens, the coils of said spring having a greater dimension in one direction than in another, said spring being fitted snugly within the aperture, and a screw for holding the lens to the strap member, said screw being positioned within said coiled spring and threaded into said opening, the sides of the screw being in frictional engagement with the inner faces of the coiled spring.

4. In an ophthalmic mounting, the combination of a lens having a substantially circular aperture, a strap member engaging one face of the lens, a spirally coiled spring positioned within said aperture, the coils of said springs being of a generally elliptical shape with its major axis substantially of the same length as the diameter of said aperture and with the minor axis of substantially less length than the diameter of said aperture whereby the spring is snugly held in said aperture while still having a clearance between the spring and wall of the aperture, and a retaining member for holding the lens to the strap, said retaining member being positioned within said spring and secured to said strap member, the diameter of said retaining member being slightly greater than the shortest internal dimension of said spring whereby the retaining member will be yieldably engaged by the spring.

SAMUEL E. BOUCHARD.